United States Patent [19]

Matsubara et al.

[11] Patent Number: 4,699,976
[45] Date of Patent: Oct. 13, 1987

[54] CONTINUOUS PROCESS FOR THE TREATMENT OF POLYMER COMPOSITION TO REMOVE UNREACTED MONOMER AND SOLVENT

[75] Inventors: Tetsuyuki Matsubara, Yokohama; Norifumi Ito, Kamakura; Mune Iwamoto; Toshihiko Ando, both of Yokohama, all of Japan

[73] Assignees: Mitsui Toatsu Chemicals, Inc.; Toyo Engineering Corporation, both of Tokyo,, Japan

[21] Appl. No.: 843,964

[22] Filed: Mar. 25, 1986

[30] Foreign Application Priority Data

Apr. 1, 1985 [JP] Japan .................................. 60-66655

[51] Int. Cl.$^4$ ............................................... C08F 6/10
[52] U.S. Cl. ..................................... 528/501; 525/232; 525/233; 525/240; 525/316; 528/481
[58] Field of Search ................................ 528/501, 481

[56] References Cited

U.S. PATENT DOCUMENTS

| 4,439,601 | 3/1984 | McCurdy et al. | 528/501 |
| 4,537,954 | 8/1985 | Ando et al. | 528/501 |

*Primary Examiner*—Wilbert J. Briggs, Sr.
*Attorney, Agent, or Firm*—Flynn, Thiel, Boutell & Tanis

[57] ABSTRACT

Disclosed is a continuous treating process of a rubber modified styrenic polymer composition produced by bulk or solution polymerization and containing at least 1% by weight of a rubber component and at least 16% by weight of the total amount of an unreacted monomer and solvent which process comprises treating the polymer composition in two-step volatile component separation apparatuses, each of which comprises a multitube preheater and a volatilizer, to remove the unreacted monomer and other volatile components wherein the first treated composition contains 3–15% by weight of the unreacted monomer and solvent.

5 Claims, 1 Drawing Figure

CONTINUOUS PROCESS FOR THE TREATMENT OF POLYMER COMPOSITION TO REMOVE UNREACTED MONOMER AND SOLVENT

BACKGROUND OF THE INVENTION

1. Field of the Invention

This invention relates to an improved continuous process for the treatment of a rubber containing styrenic polymer composition.

More specifically, this invention relates to a two-step continuous treatment process, of a rubber containing styrenic polymer composition obtained by bulk polymerization or solution polymerization, for volatilizing and separating (hereinafter referred to simply as volatilize or volatilization) volatile components such as unreacted monomer, solvent, chain transfer agent, low molecular weight polymer and others from the polymer composition. In the first step, the volatilization of the volatile components takes place at a low temperature to permit a part of the unreacted monomer and solvent to remain, while in the second step the volatilization takes place under high vacuum, whereby the content of volatile components remaining in the final product is reduced to the lowest level without any deterioration in the physical properties of the final product and with low consumption of energy upon treatment. 2. Description of the Prior Art:

Conventionally, there have been disclosed a process for continuously removing the volatile components from the polymer composition, in which the composition is preheated or preheated while being foamed to be flashed into a volatilizer under reduced pressure (for example, Japanese Patent Publication No. 44323/85 and U.S. Pat. Nos. 3,928,300 and 3,966,538).

Recently, from the standpoint of food hygiene such as food packaging, and the like, it is desired to reduce the residual volatile components such as unreacted monomer, solvent and the like in the resin product to as low a level as possible and technical countermeasures therefor are an urgent problem.

In order to meet the above requirements, the prior art provides processes operating a preheater at a raised temperature and a volatilizer under high degree of vacuum. However, these processes have limits on the grounds below, and thus it is very difficult to reduce volatile components contained in the polymer composition below a predetermined level. That is, as the heating temperature in the preheater is raised, the remaining monomer polymerizes, thereby increasing the amount of low molecular weight polymers in the polymer composition, resulting in a reduced heat resistance of the molded product. Further, the elevated temperature of the polymer composition treated causes decomposition and color deterioration of the product and, in particular, in the case of rubber modified polymer composition, deterioration in the physical properties such as impact strength, due to cross linking of the rubber component. Moreover, to operate the volatilizer under an increased degree of vacuum causes the amount of gasified volatile components to increase, and thereby enhances the pressure drop during an evacuating pipe and a condenser in the volatile components recovery step. Thus, both the pipe and condenser having respective extremely large diameters are required, which cause extremely high costs. In certain cases, it was substantially difficult to provide an equipment operating under a certain high degree of vacuum.

To cope with the increased gas volume of the volatile components due to an elevated degree of vacuum in the volatilizer, there is disclosed a process for removing volatile components by using volatile component separation apparatuses in more than two steps (for example, U.S. Pat. No. 4,537,954).

However, according to the above processes, it was necessary to raise the temperature of a pretreated composition, prior to its being introduced into the final volatile component separation apparatus, to a certain high level in order to maintain the flowability of the treated mixture, because the composition contains only a small amount of volatile components, and has a high viscosity. In that event it was also necessary to add thereto a foaming agent in order to increase the surface area of the pretreated composition to conduct efficient foaming for volatization.

In manufacturing rubber containing styrenic polymers, it is required to maintain their impact resistance, tensile strength, heat resistance and color at respective high levels simultaneously with reduced contents of the volatile components therein. From industrial aspects, a simpler apparatus is desirable in removing volatile components.

As the prior art, there are disclosed processes for continuously removing the volatile substances in styrenic polymer compositions, in which the polymer compositions are treated at a temperature of 235° C. or higher by using two step volatilization apparatus. U.S. Pat. Nos. 3,928,300 and 3,966,538 disclose a flashing room temperature of 235° C., a degree of vacuum of 25 mmHg and a remaining styrene monomer content of 0.1%. Another process effects stirring in the first step volatilizer and/or the second step volatilizer (Japanese Patent Application Laid-Open Nos. 126412/84 and 126411/84). According to the process of U.S. Pat. Nos. 3,928,300 and 3,966,538, the content of the remaining styrenic monomer is not low satisfactorily, and the treating temperature of the polymer composition is so high that deterioration of a rubber component is promoted when a rubber-modified styrenic polymer composition is treated. Thus, the processes by the U.S. patents are unsatisfactory as a treatment process of rubber-modified styrenic polymer composition. The processes disclosed in Japanese Patent Application Laid-Open Nos. 126412/84 and 126411/84 necessitate stirring in the volatilization step, and the process disclosed in Japanese Patent Application Laid-Open No. 126411/84 necessitates addition of an antioxidant.

SUMMARY OF THE INVENTION

An object of this invention is to provide a process for the treatment of rubber-modified styrenic polymer composition, which process enables the content of the volatile components in the polymer product to be reduced to an extremely low level while maintaining high physical properties of the product by maintaining the treating temperature of the polymer composition at a low level, and which process is simple without employing stirring or a foaming agent during a volatilization step.

Another object of this invention is to provide a novel and simple process for continuously treating the rubber containing styrenic polymer composition, which process can reduce equipment costs and consumption of energy, and efficiently remove the remaining volatile components in the polymer composition to a low level without lowering the physical properties of the polymer product.

BRIEF DESCRIPTION OF THE DRAWING

The drawing is a flow sheet showing an example embodying the continuous treating process of the polymer composition according to this invention.

In the drawing, the reference numbers identify the following parts:

Figure 1:
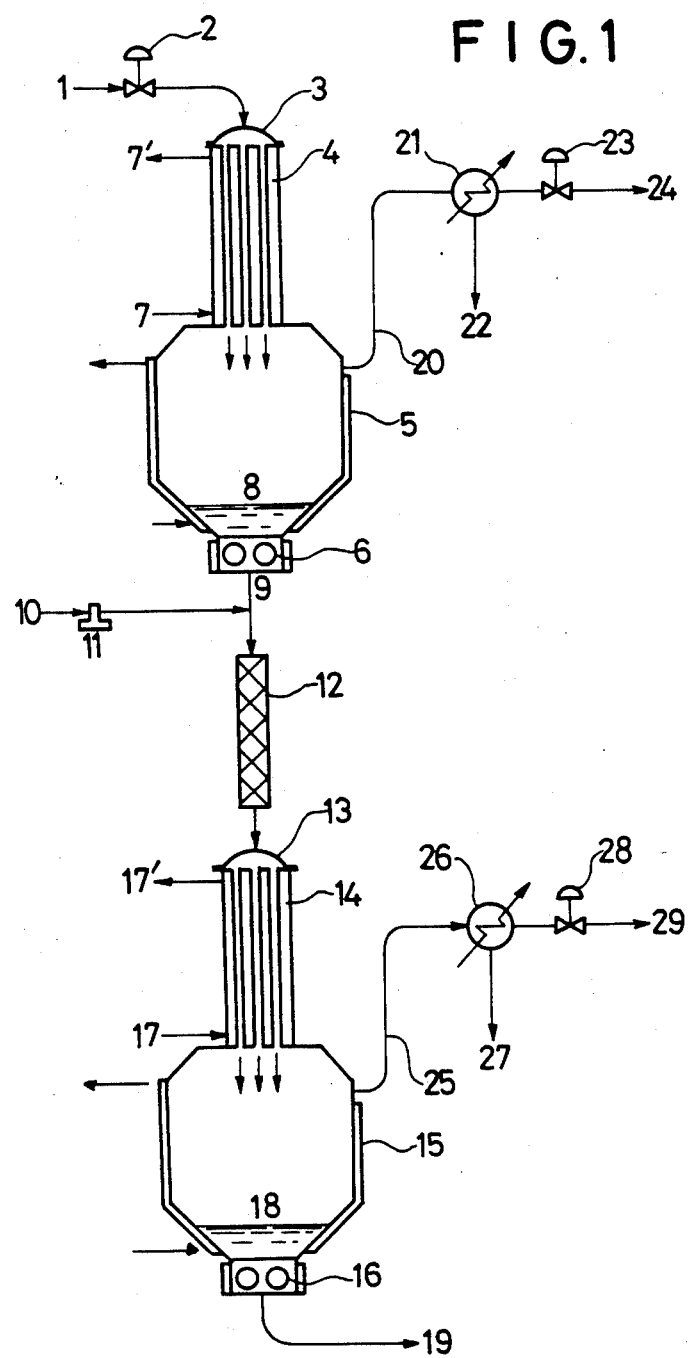

2: Pressure regulating valve of polymerization reactor
3: Inlet of the first step volatile component separation apparatus
4: The first step multi-tube heat exchanger type preheater
5: The first step volatilizer
6: The first step discharge pump
9: Pipe connecting the first and second step volatile component separation apparatuses
11: Additive-feed pump
12: Static mixer
13: Inlet of the second step volatile component separation apparatus
14: The second step multi-tube heat exchanger type preheater
15: The second step volatilizer
16: The second step discharge pump
21: Condenser for the first step gas recovery
23: Pressure regulating value of the first step volatilizer
26: Condenser for the second step gas recovery
28: Pressure regulating valve of the second step volatilizer

DETAILED DESCRIPTION OF THE INVENTION

According to the present invention, upon a continuous treatment of a rubber modified styrenic polymer composition, which is obtained by bulk or solution polymerization and contains at least 1% by weight of a rubber component, and at least 16% by weight of total amount of an unreacted monomer and, optionally a solvent, it is very effective to efficiently remove volatile components in two steps by using two volatile component separation apparatuses each of which consists of a multi-tube heat exchanger type preheater having a partly spherical end-plate at the top and a volatilizer where the preheater is directly connected with the volatilizer and both are arranged vertically. A polymer composition from a final polymerization reactor is sent to the end-plate at the top of the first volatile component separation apparatus through a pressure regulating valve, and is allowed to foam while being heated in the first preheater, whereby a first volatile component separation procedure takes place under such temperature and pressure conditions that a first treated composition of the polymer composition, which is discharged from the bottom of the first volatilizer, contains 3–15% by weight of the unreacted monomer and solvent, and the temperature thereof is 150°–220° C. The first treated composition in the first step is continuously discharged from the bottom of the first volatilizer and introduced to the end-plate at the top of the second volatile component separation apparatus through a connecting pipe, and is allowed to foam while being heated in the second preheater, whereby the second volatile component separation procedure takes place under the pressure of the second volatilizer at 50 mmHg or lower. Aforementioned procedures are carried out so that the sum of the average residence time of the first treated mixture staying at the bottom the first volatilizer and the average residence time of the composition from the outlet of the first volatilizer to the inlet of the second volatile component separation apparatus may be 30 minutes or less.

The styrenic polymer composition in the present invention means a polymer composition that contains polymers of at least one monomer selected from styrenic monomers such as styrene, α-methylstyrene, o-methylstyrene, m-methylstyrene, p-methylstyrene, o-tert-butylstyrene, m-tert-butylstyrene, p-tert-butylstyrene, halogen-substituted styrene, for example, chlorostyrene, bromostyrene, and the like; or contains copolymers of at least one of these styrenic monomers and at least one comonomer selected from monomers copolymerizable with styrenic monomer or monomers such as acrylic monomers, for example, methylacrylate and methylmethacrylate, maleic anhydride, maleic imide and the like, and further contains the unreacted monomer and a solvent, and at least 1% by weight of a rubber component. The rubber component includes those usually used as an impact improver for a styrenic polymer, and specifically includes polybutadiene rubber, styrene-butadiene copolymer rubber, acrylonitrile-butadiene copolymer rubber, polyisoprene rubber, polychloroprene rubber, ethylene-propylene copolymer rubber, ethylene-propylene-diene copolymer rubber, and the like. The polymerization is carried out by known bulk polymerization or solution polymerization. On polymerization, optionally a solvent such as ethylbenzene, toluene, methyl ethyl ketone or the like, may be used, and such a solvent may be contained in the styrenic polymer composition in the present invention. A molecular weight modifier such as mercaptan may be contained therein.

This invention relates to a case where the total amount of the unreacted monomer and optionally the solvent at the outlet of the final polymerization reactor is 16% by weight or higher. When the total amount is less than 16% by weight, the use of the two step volatile component separation apparatuses as in the present invention is not always necessary.

It is preferred to provide a pressure regulating valve between the final polymerization reactor and the first volatile component separation apparatus in order to control the pressure on the side of the polymerization reactor at a pressure higher than the vapor pressure of the polymer composition at the temperature of the reactor. In the case where the pressure control is not conducted appropriately, the flow of the polymer composition to the first volatile component separation apparatus becomes irregular, and the temperature and pressure control in the first volatile component separation apparatus becomes difficult. The regulating valve used may be an automatic type or manual type. Each of the volatile component separation apparatuses of the present invention should be arranged vertically and should have such a construction that a multi-tube heat exchanger type preheater having a partly spherical end-plate at its top is directly connected with a volatilizer. The polymer composition or the first treated composition of the polymer composition is sent to the end-plate at the top of each apparatus and is allowed to flow down by the gravity and pressure gradient through the inside of the tubes of the multi-tube heat exchanger in a foamed state while being heated into the volatilizer kept under a predetermined pressure. A heating medium of liquid or vapor form passes in the shell side of the multitube heat exchanger to heat the polymer composition or the treated composition of the polymer composition inside the tubes. It is preferred that the partly spherical end-plate at the top of the multi-tube heat exchanger has such a structure that the inner volume thereof is as small as possible and the composition is forced to flow uniformly into the tubes of the multi-tube heat exchanger.

The procedures in the first step of the present invention are carried out under such pressure and temperature conditions that the first treated composition of the polymer composition, which is discharged from the bottom of the vacuum volatilizer of the first volatile component separation apparatus, contains 3–15% by weight, preferably 4–12% by weight of the unreacted monomer and solvent, and the temperature of the first treated composition is 150°–220° C. Specifically, it is necessary to obtain the first treated composition having a predetermined composition by allowing the polymer composition to flow down and foam while being heated in the multi-tube heat exchanger type preheater, thereby removing a part of volatile components in the volatilizer. The temperature of the first treated composition should be determined depending on the predetermined composition and the pressure in the volatilizer which is maintained in the range of 100–2000 mmHg.

When the temperature of the first treated composition volatilized in the first volatile component separation apparatus is higher than 220° C., formation of low molecular weight polymers increases due to polymerization of the unreacted monomer, and thus the heat resistance of the obtained product is reduced, the crosslinking of the rubber component in the polymer composition is promoted, and the physical properties of the product such as impact strength are lowered. By contrast, at lower than 150° C., the viscosity of the first treated composition increases and the flowability of the composition worsens. Thus, a constant discharge of the composition from the vacuum volatilizer becomes difficult, and further a long staying portion forms which causes the quality of the product to worsen. We found that when the first treated composition contains only less than 3% by weight of the unreacted monomer and solvent, in the second preheater the foaming becomes insufficient under predetermined temperature conditions (preferably in the range of from 190° C. to 230° C.), with the result that removal of the volatile components of the second treated composition at the outlet of the second volatilizer becomes inadequate. When the first treated composition contains more than 15% by weight of the unreacted monomer and solvent, the gas volume of volatile components separated in the second volatile component separation apparatus under a high vacuum increases, thereby requiring too large facilities.

The procedures in the second step of this invention are carried out by maintaining the pressure of the volatilizer of the second volatile component separation apparatus at 50 mmHg or lower, preferably 30 mmHg or lower, most preferably 9 mmHg or lower. When the pressure is higher than 50 mmHg, the remaining volatile components are not separated sufficiently. The temperature of the second treated composition after heated in the second multi-tube heat exchanger type preheater is preferably in the range of from 190° C. to 230° C. When the temperature of the second treated composition is lower than 190° C., the viscosity of the second treated composition increases, worsening the flowability of the composition, making it difficult to discharge the second treated composition from the volatilizer at a constant rate, and also causing the volatile components to separate incompletely. A degree of deterioration of the rubber component in the present invention can be evaluated by a relative value of solvent swelling for the rubber component in the polymer product and the impact strength of the product. Examples of the solvent used include toluene, methyl ethyl ketone, tetrahydrofuran and the like. Toluene swelling is effective in the case where styrenic polymer is the major component. A polymer product in an amount of 1–2 gr is put to be dissolved into 30 cc of toluene, and the rubber component swelled with toluene is separated from a toluene soluble component by a centrifugal separating method. The rubber component swelled with toluene is isolated by decantation, and the weight ($W_1$) of the isolated rubber component is measured. After removing toluene from the isolated rubber component by vacuum drying, the weight of the rubber component is measured. Swelling is shown as follows:

Swelling = $W_1/W_2$ (time)

It is considered that the lower this value, the more the rubber component is deteriorated.

It is important for foaming and heating throughout both preheaters to take place simultaneously in the first and second volatilization steps of the present invention. Such foaming can be recognized, for example, by observing the first and second treated compositions flowing down from the respective preheaters through a glass window or the like by the naked eye from outside. While foaming of composition takes place, heating is conducted to maintain the temperatures of the first and second treated compositions at respective predetermined levels. Simultaneous foaming and heating in both steps according to the present invention result in inhibition of deterioration of the rubber component, control of the formation of low molecular weight polymers and making the facilities simpler. The present inventors found that since the rubber containing styrenic polymer composition has higher viscosity compared with those free of a rubber component, particularly in the second volatilization step, it is difficult to develop such conditions as to foam the composition while heating it even if the temperature and the degree of vacuum therein are controlled at their respective certain levels. Further, the inventors found that in particular, in the second volatilization treatment, the remaining volatile components can be reduced to an extremely low level while enforcing the simultaneous foaming and heating ① by using an apparatus in which a multi-tube heat exchanger type preheater having a partly spherical end-plate is directly connected with a volatilizer, and ② by specifying the total amount of unreacted monomer and solvent in the first treated composition from the first step. The partly spherical end-plate is effective for the composition to be treated to distribute uniformly and fall down from the preheater, and is indispensable to the simultaneous foaming with heating.

The composition of the first treated composition formed by the treatment in the first step is preferred to be such that the total amount of the solvent of at least one selected from ethylbenzene, toluene and xylene is in the range of from 15 to 200 parts by weight, preferably 20 to 150 parts by weight per 100 parts by weight of the rubber component in the first treated mixture. Such an amount of the solvent can be controlled by adjusting the amount of the solvent in the styrenic polymer composition introduced to the first treatment. When the total amount of the solvent is less than 15 parts by weight, undesirable deterioration of the rubber component in the treated composition and formation of low molecular weight styrenic polymers tend to occur. When the total amount of the solvent is more than 200 parts by weight, the effect of controlling such deterioration and formation of low molecular weight polymers does not increase any more, only incurring high load of the volatilization treatment.

In the practice of the present invention, the first treated composition from the first volatile component separation apparatus is continuously discharged by a discharge pump provided in the lower part of the first volatilizer and is sent to the end-plate at the top of the second volatile component separation apparatus after passing through a connecting pipe. The sum of the average residence time of the first treated composition staying in the first volatilizer and the average residence time of the composition in the connecting pipe from the bottom outlet of the first volatilizer to the inlet of the second volatile component separation apparatus should be regulated to be 30 minutes or less. When the sum of the residence time is over 30 minutes, undesirably formation of low molecular weight polymers is promoted due to polymerization of the remaining monomer, heat resistance of the polymer product is reduced, crosslinking of the rubber component in the treated composition is promoted, and physical properties such as impact strength of the product worsen.

In the present invention, a stationary mixing device may be provided in the connecting pipe from the outlet of the first volatilizer to the inlet of the second volatile component separation apparatus. Various additives such as self-lubricating agent, release agent, and others may be added in the above pipe. In this case, it is preferred that the first treated composition and the additive be well dispersed and mixed in the static mixer so as to enable the first treated mixture to foam uniformly in the second volatile component separation apparatus. Even if no additive is introduced, the static mixer improves the flow rate profile and temperature profile of the fluid in the connecting pipe, thus prevents formation of dead spaces, and enables the first treated composition to foam uniformly in the second volatile component separation apparatus. The static mixer means a mixer which is not provided with a driving part, and includes, for example, a static mixer and a static mixing element.

A preferred embodiment of the present invention is explained with reference to the flow sheet in the drawing. A rubber containing styrenic polymer composition obtained by continuous bulk polymerization or solution polymerization is sent from 1 through pressure regulating valve 2 to end-plate 3 at the top of the first vertically arranged multi-tube heat exchanger type preheater 4. The polymer composition flows down while being heated and foamed into the first volatilizer 5 held under a predetermined pressure in the range of from 200 to 1000 mmHg. Heating in the multi-tube heat exchanger type preheater 4 is effected, for example, by allowing a heating medium to flow from 7 to 7'. the portions of the gasified monomer, solvent and others pass through pipe 20 and are condensed in condenser 21 which is cooled with a refrigerant, and are recovered in the liquid state through pipe 22. The pressure of the first volatilizer 5 is controlled to a predetermined pressure by pressure regulating valve 23.

The first treated composition 8, which falls down to the bottom of the first volatilizer 5, is controlled so as to contain 3–15% by weight of the unreacted monomer and solvent and have a temperature of 150–220° C. at the outlet of volatilizer 5. The first treated composition 8 is discharged quantitatively by discharge pump 6, and is sent to end-plate 13 at the top of the second vertically arranged volatile component separation apparatus through pipe 9. Static mixer 12 is provided in pipe 9, and optionally, an additive may be introduced by pump 11 and can be dispersed and mixed in the mixer. As mentioned above, it is essential to regulate the sum of the residence time of the first treated composition between the first discharge pump 9 and the inlet 13 of the second volatile component separation apparatus and the residence time of the composition at the bottom of the first volatilizer to 30 minutes or less.

The first treated composition sent to endplate 13 at the top of the second volatile component separation apparatus flows down, while being heated and foamed by a multi-tube heat exchanger type preheater 14 in the same manner as in the first volatile component separation apparatus, into the second volatilizer 15 under a predetermined pressure of 50 mmHg or lower by the gravity and pressure gradient. Heating in the multi-tube heat exchanger type preheater 14 is conducted, for example, by allowing a heating medium to flow from 17 to 17'. The treated composition should be uniformly foamed at the outlet of the tubes of the second multitube heat exchanger type preheater. The volatile components gasified in the second volatile component separation apparatus pass through pipe 25 and are condensed in condenser 26 cooled with a refrigerant, and the condensed portion is recovered through pipe 27. The pressure of the second volatilizer 15 is regulated to a predetermined pressure by pressure regulating value 28. The second treated composition falling to the bottom of the second volatilizer is controlled to be 190° C. or higher and quantitatively discharged by discharge pump 16, and passes through pipe 19 to obtain a product. The content of the monomer and solvent remaining in the second treated composition discharged from the second discharge pump 16 is normally 0.15% by weight or less.

The two step treatment of this invention uses two volatile component separation apparatuses and has the following advantages: In the first step, the gas volume passing through pipe 20 is reduced because of a high pressure at the volatilizer, and since the condensation temperature of the separated volatile components under that pressure is higher, the volatile components can be recovered with reduced load for cooling in condenser 21. In the second step, since the volatile components have already been removed to some extent, the amount of the volatile components to be volatilized is reduced by that extent, and since the remaining volatile components from the first step act as a foaming agent, there is no need of adding other foaming agent.

The process of the present invention can reduce the content of volatile components such as unreacted monomer, solvent, molecular weight modifier, low molecular weight polymers and other materials in the polymer composition to a low level compared with the prior art, while controlling increase of equipment costs and energy consumption. The polymer product thus obtained has a high heat resistance and less occurrence of defects such as gum on molding. Its physical properties such as impact strength are maintained at an extremely high level without deterioration of the rubber component.

The present invention will be explained by the following Examples, but is not to be limited on these Examples.

EXAMPLE 1

A starting material solution containing 5% by weight of polybutadiene as the rubber component, 15% by weight of ethylbenzene as the solvent and 80% by weight of styrene monomer was continuously fed to a series of polymerization reactors at a flow rate of 1600 kg/hr to carry out polymerization. The degree of polymerization of styrene at the outlet of the final polymerization reactor was 70%, and the polymer composition contained 24% by weight of styrene and 15% by weight of ethylbenzene. The polymer composition was continuously treated in two steps by use of the apparatus as shown in the drawing, to remove the volatile components such as unreacted monomer and solvent. The polymer composition from the final polymerization reactor at the flow rate of 1600 kg/hr passed through the pressure regulating valve to the end-plate at the top of the first volatile component separation apparatus, and flowed down into the first volatilizer under a pressure of 400 mmHg while being heated in the first multi-tube heat exchanger type preheater. In the first preheater, a heating medium having an inlet temperature of 220° C. was passed from the lower part of the shell side to the upper part by controlling the flow rate in order that the temperature of the first treated composition, which fell down to the bottom of the volatilizer, was 170° C. The treated composition out of the tubes of the preheater fell down to the bottom of the first volatilizer in a foamed state. The first treated composition accumulated at the bottom of the first volatilizer was continuously discharged by use of a discharge pump, and passed through the pipe to the second volatile component separation apparatus. Sampling of the first treated composition was made for analysis at the outlet of the first discharge gear pump. The sum of styrene monomer and ethylbenzene contained therein was 8% by weight. A static mixing device was provided in the conduit connecting the outlet of the first discharge gear pump with the second volatile component separation apparatus. The residence time of the first treated composition between the pump and the second apparatus was 8 minutes. About 200 l of the first treated composition accumulated at the bottom of the first volatilizer. Therefore, the total residence time of the first treated mixture was about 18 minutes.

The first treated composition fed to the endplate at the top of the second volatile component separation apparatus fell down into a second volatilizer under a pressure of 10 mmHg while being heated in a second multi-tube heat exchanger type preheater. In the second preheater as in the first preheater, a heating medium having an inlet temperature of 250° C. is allowed to flow on the shell side to control the temperature of the second treated composition, which fell down to the bottom of the volatilizer, to be 220° C. The treated composition at the outlet of the tubes of the preheater was uniformly foamed and fell down into the second volatilizer. The second treated composition accumulated at the bottom of the second volatilizer was continuously discharged by a discharge gear pump to obtain a product by use of a pelletization apparatus.

The analyses of the pellets obtained and the physical properties of molded pieces from the pellets are shown in Table 1. The amounts of the remaining volatile components and styrene oligomer measured as methanol soluble components in the pellets were at an extremely low level. The molded product was free of molding defects such as burning rubbish, fish eye, silver, and was colorless.

COMPARATIVE EXAMPLE 1

The procedures of Example 1 were repeated except that the first volatile component separation apparatus was operated under such conditions that the pressure is 300 mmHg and the temperature of the first treated composition is 210° C. The total content of styrene monomer and ethylbenzene in the first treated composition at the outlet of the first discharge pump was about 2% by weight, and at the outlet of the second preheater, foaming of the treated composition was insufficient. The remaining volatile components and methanol soluble components in the product increased. Results of analysis and evaluation of physical properties are shown in Table 1.

COMPARATIVE EXAMPLE 2

The procedures of Example 1 were repeated except that the pressure in the first volatile component separation apparatus was 800 mmHg absolute, the temperature of the first treated composition and that of the second treated composition were 230° C. and 240° C., respectively. The total content of styrene monomer and ethylbenzene in the first treated composition at the outlet of the first discharge pump was about 5% by weight. The product indicated a high value of methanol soluble components, which showed that some unreacted monomer polymerized. Crosslinking of the rubber component in the product was promoted, the molecular weight of the resin phase was lower than that in Example 1, and the impact strength of the product was also low. The color of the product was yellowish compared with Example 1.

COMPARATIVE EXAMPLE 3

The procedures of Example 1 were repeated except that pressure of the first volatile component separation apparatus was 100 mmHg and the temperature of the first treated composition was 230° C. The total content of styrene monomer and ethylbenzene in the first treated composition at the outlet of the first discharge pump was 0.5% by weight. The treated composition at the outlet of the tubes of the second preheater was hardly foamed. The remaining volatile components and methanol soluble components in the product increased.

COMPARATIVE EXAMPLE 4

The procedures of Example 1 were repeated except that the first volatile component separation apparatus was operated under the condition that about 1500 l of the first treated composition were accumulated in the first volatilizer. The total residence time of the first treated composition in the first volatilizer and in the pipe between the first and second volatile component separation apparatuses was about 70 minutes. The remaining volatile components in the product were reduced, but the amount of the methanol soluble components therein increased.

COMPARATIVE EXAMPLE 5

The procedures of Example 1 were repeated except that the second volatile component separation apparatus was operated under a pressure of 100 mmHg.

Both the remaining volatile components and methanol soluble components in the product increased.

COMPARATIVE EXAMPLE 6

The procedures of Example 1 were repeated except that the second volatile component separation apparatus comprising a multi-tube heat exchanger indirectly connected through a conduit with a volatilizer was used in place of the above apparatus comprising a preheater directly connected with a volatilizer. In the second apparatus, the temperature of the treated composition at the outlet of the second preheater was 250° C., and the treated composition was introduced to the second volatilizer. The temperature of the second treated composition, which fell down into the second volatilizer, was reduced to 230° C. because of heat loss due to latent heat of vaporization. The remaining volatile components and methanol soluble components in the product increased and crosslinking of the rubber component was also promoted compared with Example 1.

EXAMPLE 2 the melt flow of the product was stable. The liquid paraffin is considered to be sufficiently mixed with the product.

COMPARATIVE EXAMPLE 7

Following Example 1, the polymer composition was treated only in one step by using the same type of the volatile component separation apparatus as in Example 1. The polymer composition from the final polymerization reactor was fed through the pressure regulating valve to the volatile component separation apparatus, and the preheater was controlled for operation in order that the temperature of the treated composition, which fell to the bottom of the volatilizer, was 220° C. Since the amount of gasified volatile components was tremendous large and thus the pressure drop through the evacuating pipe to the gas recovery including the condenser was great, it was only possible to maintain the pressure of the volatilizer just at 25 mmHg.

The remaining volatile components and methanol soluble components in the product obtained increased compared with Example 1.

TABLE 1

| | Treatment Conditions and Results | | | | | | | | |
|---|---|---|---|---|---|---|---|---|---|
| | Ex. 1 | Ex. 2 | Comp. Ex. 1 | Comp. Ex. 2 | Comp. Ex. 3 | Comp. Ex. 4 | Comp. Ex. 5 | Comp. Ex. 6*[8] | Comp. Ex. 7*[9] |
| Condition of the first volatile component separation apparatus | | | | | | | | | |
| volatilizer pressure (mmHg) | 400 | 400 | 300 | 800 | 100 | 400 | 400 | 400 | |
| Temperature of treated composition (°C.) | 170 | 170 | 210 | 230 | 230 | 170 | 170 | 170 | |
| Total content of monomer and solvent in the treated composition (% by weight) | 8 | 8 | 2 | 5 | 0.5 | 8 | 8 | 8 | |
| Amount of the treated composition accumulated at the bottom of volatilizer (l) | 200 | 200 | 400 | 200 | 200 | 1200 | 200 | 200 | |
| Average residence time of the treated composition (minute)** | 18 | 18 | 28 | 18 | 18 | 70 | 18 | 18 | |
| Feeding of additive at the outlet of the first volatile component separation apparatus | — | liquid paraffin to composition | — | — | — | — | — | — | |
| Conditions of the second volatile component separation apparatus | | | | | | | | | |
| Volatilizer pressure (mmHg absolute) | 5 | 10 | 10 | 10 | 10 | 10 | 100 | 10 | 25 |
| Composition temperature (°C.) | 220 | 220 | 220 | 220 | 240 | 220 | 230 | 230 | 220 |
| Product analysis | | | | | | | | | |
| Volatile components (monomer + solvent: ppm)*[1] | 370 | 640 | 2840 | 610 | 2530 | 660 | 4240 | 1750 | 1680 |
| Methanol soluble components (% by weight)*[2] | 1.2 | 3.2 | 1.4 | 1.5 | 1.6 | 1.5 | 1.6 | 1.7 | 1.9 |
| Swelling (time)*[3] | 13 | 13 | 11 | 10 | 8 | 13 | 13 | 10 | 13 |
| Intrinsic viscosity (polystyrene phase)*[4] | 0.72 | 0.72 | 0.71 | 0.69 | 0.70 | 0.71 | 0.72 | 0.69 | 0.72 |
| Evaluation of the Product | | | | | | | | | |
| Melt flow (8/10 min.)*[5] | 3.1 | 4.3 | 3.6 | 4.1 | 3.9 | 3.5 | 3.3 | 4.3 | 3.3 |
| Vicat softening point (°C.)*[6] | 102.2 | 96.8 | 101.5 | 101.0 | 100.7 | 101.3 | 100.5 | 100.2 | 100.0 |
| Izod impact strength (kg · cm/cm)*[7] | 8.0 | 8.3 | 7.1 | 6.3 | 5.6 | 8.1 | 81. | 6.5 | 8.1 |

**Total of average residence time in the bottom of the first volatilizer and average residence time in the course of from the volatilizer to the inlet of the second volatile component separation apparatus.
*[1]Analysis by FID type gas chromatography;
*[2]Values obtained by substracting methanol reprecipitated components from the amount of the sample;
*[3]Measured values with toluene;
*[4]Measured in toluene solution at 30° C. by Ubbelohdes viscometer;
*[5]JIS K6871, 200° C. 5 kg;
*[6]ASTM D-1525;
*[7]JIS K6871 with ⅛ inch notch;
*[8]Alternative type of the second volatile component separation apparatus is used;
*[9]Treatment in one step.

The procedures of Example 1 were repeated except that liquid paraffin was continuously fed at a flow rate of 28 kg/hr to the outlet of the first discharge pump to be mixed with the first treated composition. The foaming condition of the treated composition in the second volatile component separation apparatus was good, and

EXAMPLE 3~5

A polymerization was continuously carried out by using a starting material consisting of 3% by weight of the rubber component and 97% by weight of styrene, and continued until conversion of styrene at the outlet of the polymerization reactor reached 78%. Ethylbenzene was added before the pressure regulating value in an amount of 1, 20 and 50% by weight in Examples 3–5, respectively, per 100% by weight of the olymer composition to be treated by the same apparatus as in Example 1. The first step treatment was carried out under the conditions that the degree of vacuum in the first volatilizer was 800 mmHg and the temperature of the first treated composition was 198° C. The second treatment was carried out under the conditions that the degree of vacuum in the second volatilizer was 5 mmHg and the temperature of the second treated composition was 220° C. The total average residence time of the first treated composition in the first volatilizer and in the course of from the outlet of the first volatilizer to the inlet of the second preheater was 19 minutes. Results of analysis of the product are shown in Table 2. The table shows that a suitably chosen amount ratio of rubber to ethylbenzene within a preferable range brought about a low value of methanol soluble components and a high value of toluene swelling.

TABLE 2

|  | Ex. 3 | Ex. 4 | Ex. 5 |
| --- | --- | --- | --- |
| Composition at the inlet of the first step (% by weight) | | | |
| Styrene | 21 | 17.8 | 14.2 |
| Ethylbenzene | 1.0 | 16.7 | 33.3 |
| Polystyrene | 75 | 63.1 | 50.5 |
| Rubber | 3 | 2.5 | 2.0 |
| Composition of the first treated composition (% by weight) | | | |
| Rubber | 3.5 | 3.4 | 3.4 |
| Ethyl benzene | 0.45 | 4.8 | 7.7 |
| Rubber/Ethylbenzene ratio | 100/12.9 | 100.141 | 100/226 |
| Results of analysis (Resin product) | | | |
| Remaining volatile components (ppm)*[1] | 400 | 370 | 380 |
| Molecular weight (ten thousands) | 17.8 | 18.5 | 18.4 |
| Toluene swelling (times) | 9 | 11 | 11 |
| Methanol soluble components (% by weight) | 1.7 | 1.3 | 1.3 |

*[1]Total amount of styrene and ethylbenzene (based on resin product)

What is claimed is:

1. A continuous process for treating a rubber-containing styrene polymer composition produced by bulk polymerization or solution polymerization wherein said polymer composition is a polymer composition that contains (1) polymers of at least one styrene monomer selected from the group consisting of styrene, methylstyrenes, butylstyrenes and halogen-substituted styrenes, or (2) copolymers of at least one of said styrene monomers and at least one comonomer copolymerizable with said styrene monomer and selected from the group consisting of acrylic monomers, methacrylic monomers, maleic anhydride and maleic imide, said polymer composition also containing at least 16% by weight of unreacted monomer and a solvent, said polymer composition further containing at least 1% by weight of a rubber component selected from the group consisting of polybutadiene rubber, styrene-butadiene copolymer rubber, acrylonitrile-butadiene copolymer rubber, polyisoprene rubber, polychloroprene rubber, ethylene-propylene copolymer rubber and ethylene-propylene-diene copolymer rubber, comprising the steps of: continuously passing the polymer composition through a first multi-tube preheater and therein heating the polymer composition to cause foaming thereof, then passing the foaming polymer composition downwardly into a first volatilizer which is directly connected to said first preheater, said first volatilizer having a temperature of from 150° to 220° C. and a pressure of from 100 to 2000 mm Hg, and separating volatilized components from the polymer composition, thereby obtaining a first-treated polymer composition containing from 3 to 15% by weight of the unreacted monomer and the solvent; then continuously passing the first-treated polymer composition through a second multi-tube preheater and therein heating the first-treated polymer composition to cause foaming thereof, then passing the foaming first-treated polymer composition downwardly into a second volatilizer which is directly connected to said second preheater, said second volatilizer having a temperature of from 190° to 230° C. and a pressure of 50 mm Hg or lower, and separating volatilized components from the first-treated polymer composition, thereby obtaining a twice-treated polymer composition, the sum of the average residence time of the first-treated polymer composition in the bottom of said first volatilizer and the average residence time of the first-treated polymer composition in the course of passing from said first volatilizer to the inlet of said second preheater being 30 minutes or less.

2. A continuous treating process as claimed in claim 1, including a pipe connecting said first volatilizer with said second preheater so that the first-treated composition flows therethrough and further including a static mixer provided in said pipe.

3. A continuous treating process as claimed in claim 1, wherein the rubber-containing styrene polymer composition contains as the major components the rubber component, the styrene polymer, the styrene monomer and at least one solvent selected from the group consisting of ethylbenzene, toluene and xylene, and the second treatment is carried out so that the temperature of the twice treated composition is in the range of from 190° to 230° C.

4. A continuous treating process as claimed in claim 1, wherein the composition of said first treated composition contains at least one solvent selected from the group consisting of ethylbenzene, toluene and xylene, the amount of said solvent being in the range of from 15 to 200 parts by weight of said solvent per 100 parts by weight of the rubber component.

5. A continuous process for treating a rubber-containing styrene polymer composition produced by bulk polymerization or solution polymerization wherein said polymer composition is a polymer composition that contains (1) polymers of at least one styrene monomer selected from the group consisting of styrene, methylstyrenes, butylstyrenes and halogen-substituted styrenes, or (2) copolymers of at least one of said styrene monomers and at least one comonomer copolymerizable with said styrene monomer and selected from the group consisting of acrylic monomers, methacrylic monomers, maleic anhydride and maleic imide, said polymer composition also containing at least 16% by weight of unreacted monomer and a solvent, said polymer composition further containing at least 1% by weight of a rubber component selected from the group consisting of polybutadiene rubber, styrene-butadiene copolymer rubber, acrylonitrile-butadiene copolymer rubber, polyisoprene rubber, polychloroprene rubber, ethylene-propylene copolymer rubber and ethylene-propylene-diene copolymer rubber, consisting essentially of the steps of: continuously passing said polymer composition vertically downwardly through first and second volatile-component separation stages which are connected in series, each of said separation stages comprising a shell-and-tube heat exchanger having a partially spherical top end plate defining a chamber that communicates with the upper ends of the tubes, and a volatilization chamber whose upper end is connected directly to the lower ends of said tubes so that the polymer composition passes directly through said tubes, foams therein and then passes into said volatilization chamber, said volatilization chamber having means to withdraw vapor of volatilized component therefrom; the volatilization chamber of said first stage being at a pressure of from 100 to 2000 mm Hg and a temperature of from 150° to 220° C. and the treated polymer composition discharged from the volatilization chamber in said first stage containing from 3 to 15 percent by weight of unreacted monomer and solvent, and the sum of the average residence time of the treated polymer composition in the bottom of the volatilization chamber in said first stage and the average residence time of the composition in passing from the volatilization chamber of said first stage to the inlet of the heat exchanger of the second stage is 30 minutes or less; the volatilization chamber of the second stage being at a pressure 50 mm Hg or less and a temperature of from 190° to 230° C., and recovering from the bottom of the volatilization chamber of the second stage the twice-treated polymer composition containing 0.15 percent by weight or less of unreacted monomer plus solvent, the treatment being effected without adding a foaming agent to the polymer composition.

* * * * *